United States Patent
Qin

(10) Patent No.: US 12,489,976 B2
(45) Date of Patent: Dec. 2, 2025

(54) MOTION IMAGING COMPENSATION DEVICE AND METHOD

(71) Applicant: CHENGDU ZHONGXIN HUARUI TECHNOLOGY CO., LTD., Chengdu (CN)

(72) Inventor: Jun Qin, Chengdu (CN)

(73) Assignee: CHENGDU ZHONGXIN HUARUI TECHNOLOGY CO., LTD., Chengdu (CN)

(*) Notice: Subject to any disclaimer, the term of this patent is extended or adjusted under 35 U.S.C. 154(b) by 180 days.

(21) Appl. No.: 18/468,411

(22) Filed: Sep. 15, 2023

(65) Prior Publication Data
US 2024/0080563 A1 Mar. 7, 2024

Related U.S. Application Data

(63) Continuation of application No. PCT/CN2022/082561, filed on Mar. 23, 2022.

(30) Foreign Application Priority Data

Mar. 25, 2021 (CN) .......................... 202110317593.4
Feb. 17, 2022 (CN) .......................... 202210148880.1

(51) Int. Cl.
*H04N 23/68* (2023.01)
*H04N 23/695* (2023.01)

(52) U.S. Cl.
CPC ......... *H04N 23/687* (2023.01); *H04N 23/695* (2023.01)

(58) Field of Classification Search
CPC .. H04N 23/687; H04N 23/695; H04N 23/681; H04N 23/51; H04N 23/55;
(Continued)

(56) References Cited

U.S. PATENT DOCUMENTS 6,448,769 B1 * 9/2002 Rosenfeld ............ G01R 33/446
324/309
2007/0181834 A1 * 8/2007 Kleinschmidt ....... G01J 1/0414
250/504 R
(Continued)

FOREIGN PATENT DOCUMENTS

CN 106342270 B 6/2013
CN 105045275 A 11/2015
(Continued)

OTHER PUBLICATIONS

Junli Zhao et al., "Technology research on image motion compensation of the rotating double optical wedge", Infrared and Laser Engineering, vol. 44, No. 5, May 31, 2015, pp. 1506-1511.
(Continued)

*Primary Examiner* — Christopher K Peterson

(57) ABSTRACT

Disclosed are a motion imaging compensation device and method, relating to imaging technology. The motion imaging compensation device includes a base, an imaging unit, a motion compensation unit and a control system. The base is configured to support the imaging unit, the motion compensation unit and the control system. The motion compensation unit includes a primary rotating structure, a secondary rotating structure and an optical assembly. A rotation shaft of the secondary rotating structure is parallel to that of the primary rotating structure in the three-dimensional space, with an opposite rotating direction. The secondary rotating structure is connected to the optical assembly to drive it to rotate. Rotations of the primary rotating structure and the secondary rotating structure are controlled according to a preset control procedure. The imaging field of view is imaged in a relatively stationary state in a preset motion compensation interval.

14 Claims, 8 Drawing Sheets

(58) Field of Classification Search
CPC .......... H04N 23/80; H04N 7/18; H04N 23/54; G02B 27/644; G02B 27/642; G02B 27/64; G02B 7/1821; G02B 26/105; G02B 27/0977; G01S 17/89; G01S 17/08; G01S 7/497; G01S 17/06; G01S 3/7864; G01S 3/789; G01S 7/481
See application file for complete search history.

(56) References Cited

U.S. PATENT DOCUMENTS

| | | | |
|---|---|---|---|
| 2007/0222991 A1 | 9/2007 | Spady et al. | |
| 2010/0142757 A1* | 6/2010 | Sandstrom | G02B 26/105 358/474 |
| 2010/0183197 A1* | 7/2010 | Aikawa | G01B 11/2513 382/106 |
| 2019/0306427 A1* | 10/2019 | Matsuka | G02B 27/0977 |

FOREIGN PATENT DOCUMENTS

| | | |
|---|---|---|
| CN | 112165578 A | 1/2021 |
| CN | 112272272 A | 1/2021 |
| CN | 113189602 A | 7/2021 |

OTHER PUBLICATIONS

Jun Qin, "Compensation device and method for motion imaging", Chengdu Zhongxin Huarui Technology Co., Ltd, CN202210148880. 1, The First Office Action.

Jun Qin, "Compensation device and method for motion imaging", Chengdu Zhongxin Huarui Technology Co., Ltd, CN202210148880. 1, Notice to Grant Patent Right for Invention Application.

Jun Qin, "Compensation device and method for motion imaging", Chengdu Zhongxin Huarui Technology Co., Ltd, CN202210148880. 1, The First Office Action response.

Jun Qin, "Compensation device and method for motion imaging", Chengdu Zhongxin Huarui Technology Co., Ltd, PCT/CN2022/ 082561, International Search Report.

Jun Qin, "Compensation device and method for motion imaging", Chengdu Zhongxin Huarui Technology Co., Ltd, PCT/CN2022/ 082561, Written Opinion of the International Searching Authority.

\* cited by examiner

MOTION IMAGING COMPENSATION DEVICE AND METHOD

CROSS-REFERENCE TO RELATED APPLICATIONS

This application is a continuation of International Patent Application No. PCT/CN2022/082561, filed on Mar. 23, 2022, which claims the benefit of priority from Chinese Patent Applications No. 202110317593.4 and No. 202210148880.1, filed on Mar. 25, 2021 and Feb. 17, 2022, respectively. The content of the aforementioned application, including any intervening amendments thereto, is incorporated herein by reference in its entirety.

TECHNICAL FIELD

This application relates to motion imaging, and more particularly to a motion imaging compensation device and method.

BACKGROUND

In many motion imaging environments, the relative motion between an imaging target and an imaging system has many forms. For example, one of the imaging target and the imaging system is moving, and the other is not moving; and both the imaging target and the imaging system are moving. The speed of the relative motion is uniform or non-uniform. In the same time coordinate system, the relative motion is equivalent to the relative displacement between the imaging system and the imaging target. The generation of relative motion between the imaging target and the imaging system is an important factor in the degradation of image quality. To reduce the motion blur of the image, an effective method is to change or reduce the velocity difference of the relative motion between the camera and the target to image at a small relative displacement between the camera and the target. Various methods and devices can reduce the relative motion velocity when the relative motion velocity is low, such as a reciprocating motion method. The reciprocating motion method includes the following steps. An imaging device is controlled by a control device to move back and forth along a set trajectory. When the imaging device follows the motion of an imaging target and the speed difference between the imaging device and the imaging target is within a preset range, the control device controls the imaging device to collect image data of the imaging target. After imaging, the imaging device needs to return to the initial position before imaging to start the next imaging. The reciprocating motion method requires a long traveling time for the reciprocating motion compensation device to reach a high speed from rest when the relative motion speed is relatively high, which may increase the size of the imaging compensation device. Furthermore, the reciprocating motion undergoes a forward motion consisting of rest-start-acceleration-maintaining constant speed-deceleration-rest processes and a reverse motion having similar processes, and the length of the motion is equivalent to the amplitude. When the movement frequency of the reciprocating cycle continues to rise, high-frequency vibration is formed. In this case, a large amplitude superimposes on a high frequency to form an extremely high-speed reciprocating motion compensation, thus failing to meet the conditions of imaging.

SUMMARY

An object of the present disclosure is to provide a motion imaging compensation device and method to solve the problem that the existing motion imaging compensation device is unable to meet the imaging conditions due to the increasing reciprocating frequency during reciprocating motion.

The technical solutions of the present disclosure are described below.

In a first aspect, this application provides a motion imaging compensation device, comprising:

a base;
an imaging unit;
a motion compensation unit; and
a control system;
wherein the base is configured to fix a spatial position of the imaging unit and a spatial position of the motion compensation unit; the control system is configured to control operation of the motion imaging compensation device; the motion compensation unit comprises a primary rotating structure, a secondary rotating structure and an optical assembly; the optical assembly is arranged at an optical path between a light-sensitive target surface of the imaging unit and an imaging target; the primary rotating structure comprises a wheel plate and a primary rotation shaft, wherein the primary rotation shaft is arranged on the wheel plate, and is configured to drive the wheel plate to rotate; the secondary rotating structure comprises a secondary rotation shaft and a mounting seat for mounting the optical assembly; the secondary rotation shaft is arranged on the wheel plate of the primary rotating structure; the mounting seat is arranged on the secondary rotation shaft; the optical assembly is connected to the mounting seat and rotates along with the secondary rotation shaft; a center of the secondary rotation shaft of the secondary rotating structure is located on a ray with a center of a primary rotation shaft of the primary rotating structure as an origin; and a rotation direction of the primary rotating structure is opposite to that of the secondary rotating structure, and a rotating angular velocity of the primary rotating structure is the same as that of the secondary rotating structure.

In some embodiments, the number of the secondary rotating structure is two or more, and two or more secondary rotating structures are provided on the primary rotating structure. Any one of the plurality of secondary rotating structures can be connected to an optical assembly for motion imaging compensation. With the increase in the number of the secondary rotating structure, the imaging cycle can be shortened. The mass distribution of each of the plurality of secondary rotating structures is dynamically balanced, and the mass distribution of the motion compensation mechanism composed of the plurality of secondary rotating structures and the primary rotating structure is dynamically balanced, so as to avoid shake or vibration under rotation of the motion imaging compensation unit, thereby avoiding affecting the imaging quality. Preferably, a spatially symmetrical arrangement is adopted and adjusted through a dynamic balancing device. Specifically, vibration damping and vibration isolation are carried out on the connection structure. A motion compensation unit can be matched with a plurality of imaging units.

In some embodiments, the optical assembly comprises a first optical component connected to the secondary rotating structure, and a second optical component arranged in front of a lens, in a middle of a lens group or between a focal plane and the lens; and the first optical component and the second optical component are independently selected from the group consisting of a reflective device, a trapped wave reflective device, a semi-transparent device, a concave cylindrical surface reflective device, a convex cylindrical surface reflective device, a spherical surface reflective device, a bandpass device, a telecentric optical path device, and a combination thereof. Specifically, the optical assembly may have the function of separating the spectral energy of the imaging target scene and conducting the spectral energy to the imaging device, so that one or several spectral energy images of the target can be obtained. An optical component may be provided at the optical path of the imaging target scene into the imaging device, which can divide and guide the target field-of-view scene to different imaging units, so as to realize multi-imaging unit imaging and multi-spectral imaging.

In some embodiments, the first optical component is a reflective mirror assembly having two or more reflection directions; the reflective mirror assembly has an inverted V-shaped vertical section; and reflective mirrors of the reflective mirror assembly have different or the same spectral or/and optical characteristics. Specifically, the spectral characteristics comprise reflection characteristics, transmission characteristics and absorption characteristics. The optical characteristics comprise different geometric surface types. Specifically, imaging optical paths of a multi-group imaging unit share a reflector to guide each imaging unit to point to the same or different imaging target areas for simultaneous imaging through the difference in reflection or transmission angles between the primary optical axis and the reflector.

In some embodiments, the second optical component connected to the secondary rotating structure is a rotating optical assembly that is controlled by programs. The rotation shaft is perpendicular to the rotation shaft of the secondary rotating structure, and the axial direction of the rotation shaft of the second optical component is parallel to the direction of motion during the motion-compensated imaging.

In some embodiments, the rotating optical assembly has one or more reflective mirrors.

In some embodiments, a reflective surface of the rotating optical assembly is a conical surface.

In some embodiments, a reflective surface of the rotating optical assembly is a circular-pyramid surface.

In some embodiments, the rotating optical assembly consists of two symmetrical reflective mirrors forming an inverted-V shape.

In some embodiments, a laser ranging unit matched to the rotating optical assembly connected to the secondary rotating structure is capable of performing laser ranging or/and laser imaging of peripheral targets at the rotation speed matched by programs.

In some embodiments, the motion compensation unit is located in a vacuum or air-thin sealing environment, or the motion compensation unit and the imaging unit are both located in a vacuum or air-thin sealing environment. The primary rotating structure, the secondary rotating structure, and the optical assembly connected to the secondary rotating structure of the motion compensation unit are subjected to air-resistance reducing treatment. Since the air will generate resistance to the rotating compensation unit and thus cause vibration during the rotation of the primary rotating structure, the secondary rotating structure and the optical assembly, the primary rotating structure, the secondary rotating structure and the optical assembly are placed in a thin air or vacuum environment to minimize the effect of air resistance. If only the motion compensation unit is placed in a thin air or vacuum environment, the optical path between the imaging unit and the motion compensation unit needs to be provided with a window glass. Preferably, the imaging unit and the moving parts assembly of the motion compensation unit can be provided in a thin air or vacuum environment, eliminating the arrangement of the window glass on the optical path between the imaging unit and the motion compensation unit, which reduces the loss of light energy and thus facilitates imaging and facilitates imaging. The sealed environment is conducive for dustproof and waterproof of the imaging unit device.

In some embodiments, a concentric rotating structure is provided on the primary rotating structure; the imaging unit is provided on the concentric rotating structure; the concentric rotating structure is configured to rotate at the same angular velocity with the primary rotating structure but in a direction opposite to the rotation direction of the primary rotating structure at an imaging moment or within a motion compensation angle interval cx of the primary rotating structure; and the imaging unit is configured to rotate with the concentric rotating structure to allow a primary optical axis of a camera to move with an imaging field of view. Preferably, the motion imaging compensation device can perform motion compensation during external surround imaging operations. Panoramic photography is a typical working condition for the surround imaging. The relative motion mode of the panoramic photography is the imaging of a surround target during the rotation of the imaging unit. The device for angular motion compensation during a surround imaging operation is provided with a concentric rotating structure on a primary rotating structure. The concentric rotating structure is provided with an imaging unit. The concentric rotating structure is configured to rotate at the same angular velocity with the primary rotating structure but in a direction opposite to the rotation direction of the primary rotating structure at an imaging moment or within a motion compensation angle interval cx of the primary rotating structure. The imaging unit is configured to concentrically rotate with the concentric rotating structure to maintain "staring" on the imaging target scene during the imaging period. The number of the imaging unit can be more than one. The imaging target field of view can directly enter the camera lens or enter the imaging unit through the optical component.

In some embodiments, one or more laser devices are provided on an imaging optical path constituted by the imaging unit, and are configured to project a laser pattern onto the imaging target; the one or more laser devices are each independently a laser spot projector, a structured light projector, or a laser rangefinder; and the laser pattern projected onto the imaging target is a light spot, a light pattern, or a combination of the light spot and the light pattern based on laser wavelength and shape. Specifically, during the imaging process, a laser pattern is projected onto the imaging target scene through the imaging optical path to form an object square mark on the image. A laser emitter projecting the laser pattern onto the imaging target projects the laser pattern onto the target surface via the imaging optical path.

The laser device is connected to the secondary rotating structure, and rotates with the rotation of the secondary rotating structure. When the reflector on the secondary rotating structure keeps the imaging target area relatively stationary with the imaging target surface, the effect of the pattern projected by the laser device having a rigid connection with the secondary rotating structure on the imaging target area is also relatively stationary, or the difference in the relative motion speeds is less than a given threshold value, and the laser pattern does not produce a trailing shadow on the imaged image.

The laser unit is a laser spot projector, a structured light projector, or a laser rangefinder, and the laser pattern projected onto the imaging target is a light spot, a light pattern, or a combination of the light spot and the light pattern based on a combination of wavelength and shape of a laser. The light spot is a simple laser light spot or a light spot projected by the laser ranging device, and the light pattern is a combination of a structured light pattern, a light spot, or a pattern. The electromagnetic wavelengths of the light pattern comprise ultraviolet wavelengths, visible wavelengths, and infrared wavelengths, which can be sensed by the imaging unit and recorded as image information. Preferably, the laser ranging device may be multiple.

In some embodiments, the number of the motion compensation unit is two, namely, a first motion compensation unit and a second motion compensation unit; two motion compensation units each have one primary rotating structure and one secondary rotating structure; two primary rotating structure have the same rotation parameters and opposite rotation directions; two secondary rotating structures have the same rotation parameters and opposite rotation directions; and displacements along the same direction and attitude angles of optical assemblies provided on the two secondary rotating structures are matched to ensure that an optical path of the imaging optical path remains constant or a change in the optical path is less than a threshold. Preferably, the first motion compensation unit and the second motion compensation unit are respectively located on two sides of the imaging optical path. The primary rotating structures of the two motion compensation units have the same rotational parameters and the opposite rotational direction, so that the optical components of the two secondary rotating structures can realize isotropic displacement compensation. The two secondary rotating structures have the same rotational angular rate and the opposite rotational direction, so that the attitude angle of the optical components can be kept unchanged, enabling the angle of the conformation light of the imaging unit to remain constant. The conformation light reaches the imaging target after two reflections. Preferably, the laser ranging device can be provided on the same optical path as the imaging unit, and the laser ranging beam is unchanged or within a permissible threshold during the ranging process to ensure the accuracy of the ranging value. Preferably, the imaging unit and the laser ranging device form an integrated unit having a rigid connection.

In a second aspect, this application provides a motion imaging compensation method based on the aforementioned motion imaging compensation device, comprising:
  assuming that a relative motion between the motion imaging compensation device and the imaging target is a parallel motion or a rotation motion;
  unidirectionally rotating the primary rotating structure of the motion compensation unit such that a direction of a linear velocity component of the secondary rotating structure and an optical component of the optical assembly connected to the secondary rotating structure is the same as a motion direction of the imaging target, and a relative motion velocity difference is kept within a first threshold value; and
  rotating the optical component under control of the secondary rotating structure; wherein an angle change of a conformation light of the imaging unit is maintained within a second threshold range, so that photosensitive imaging is performed with the imaging unit and a field of view of the imaging target kept in a relative static state.

In some embodiments, time for one photographic imaging corresponds to a compensation angle $\alpha$ that the primary rotating structure of the motion compensation unit rotates. Within the compensation angle $\alpha$, the primary rotating structure changes a rotation speed such that a component difference of a linear velocity generated by a center of the rotation shaft of the secondary rotating structure in a direction of the relative motion of the imaging target is kept within the first threshold range, and the secondary rotating structure controls the optical component to rotate to keep the angle change of the conformation light of the imaging unit within the second threshold range. Specifically, a cycle of light-sensitive imaging refers to the time from the beginning to the end of the light-sensitive imaging of the imaging unit, and the cycle process corresponds to the compensation angle $\alpha$ that the primary rotating structure of the motion compensation unit rotates through during this time. The start point and the end point of the compensation angle $\alpha$ for motion imaging are defined in such a way that the adjustment of the linear velocity of the optical assembly connected to the secondary rotating structure is started before entering the start point of the compensation angle $\alpha$ interval, either by changing the rotation speed of the primary rotating structure or by changing the distance between the center of the rotation shaft of the secondary rotating structure and the center of the rotation shaft of the primary rotating structure. After entering the start point of the compensation angle $\alpha$ interval, the linear velocity components of the optical assembly of the secondary rotating structure have already met the conditions for kinematics compensation, and the linear velocity components of the optical assembly of the secondary rotating structure meet the conditions for kinematics compensation at any time within the compensation angle $\alpha$.

In some embodiments, the secondary rotating structure is driven to rotate using an independent power unit or through the power conduction from the primary rotating structure. Specifically, by changing the rotation speed of the primary rotating structure to change the velocity component of the linear velocity of the optical assembly connected to the secondary rotating structure in the direction of the relative motion of the imaging target, so that the velocity of the optical component in the direction of the relative motion of the imaging target varies according to the relative motion velocity, enabling the difference between the velocity of the optical component in the direction of the relative motion of the imaging target and the relative motion velocity of the field of view of imaging target to be kept within a set velocity difference threshold and to perform imaging. The velocity difference threshold corresponds to a displacement threshold of the imaging target on the light-sensitive target surface of the imaging unit during the imaging process. Preferably, the velocity difference threshold is zero, and the imaging target and the photographic target surface of the imaging unit are relatively stationary during the imaging process. The velocity component of the optical component in the direction of the primary optical axis of the imaging unit is controlled by a control system. The control system sends instructions for controlling the rotation speed of the primary rotating structure according to the parameters collected by the velocity sensor, or the relative motion velocity between the imaging unit and the imaging target is in motion in accordance with the instructions of the control system, e.g., the position of the imaging unit in an industrial assembly line is stationary, and the motion velocity of the products on the assembly line is controlled by the control system.

In some embodiments, an independent power unit is adopted to drive the secondary rotating structure to rotate, a distance between the center of the rotation shaft of the secondary rotating structure and the center of the rotation shaft of the primary rotating structure is changed to keep a component difference of a linear velocity generated by the rotation shaft of the secondary rotating structure in a direction of the relative motion of the imaging target within the first threshold range. Specifically, by changing the relative position between the center of the rotating shaft of the secondary rotating structure and the center of the rotating shaft of the primary rotational structure, to change the velocity component of the optical component connected to the secondary rotating structure in the direction of the relative motion of the imaging target. In this way, the velocity of the optical component in the direction of the relative motion of the imaging target varies in accordance with the speed of the relative motion of the imaging target, and the relative motion velocity between the optical component and the field of view of the imaging target is within a set velocity difference threshold value for imaging. The velocity difference threshold corresponds to a displacement threshold of the imaging target on the light-sensitive target surface of the imaging unit during the imaging process. Preferably, the velocity difference threshold is zero, and the imaging target and the photographic target surface of the imaging unit are relatively stationary during the imaging process. The trajectory of the change in the relative position between the center of the rotation shaft of the secondary rotating structure and the center of the rotation shaft of the primary rotating structure is a straight line or a curve. The direction of the change in the relative position can be along the direction of the line between the two centers to increase or decrease the distance, thereby increasing or decreasing the linear velocity of the optical component, so as to increase or decrease the velocity component of the optical component in the direction of the primary optical axis of the imaging unit. The displacement between the center of the shaft of the secondary rotating structure and the center of the shaft of the primary rotating structure can also be along the tangential direction of the primary rotating structure, to change the velocity component of the optical component in the direction of the primary optical axis of the imaging unit through the superimposed tangential velocity. It can also be a composite process of radial displacement and tangential displacement. The changing of the relative position between the center of the shaft of the secondary rotating structure and the center of the shaft of the primary rotating structure is controlled by a control system, and the position movement of the secondary rotating structure can be realized based on mechanical or electro-dynamic forces or magnetic forces. The motion control system converts the parameters collected by the speed sensor into control commands for position changing, or the position changing process is executed in accordance with the program parameters set by the control system.

Under the working condition of constant rotation speed, the longer the distance between the center of the shaft of the secondary rotating structure and the center of the shaft of the primary rotating structure, the greater the linear velocity obtained by the rotation shaft of the secondary rotating structure, which can realize the imaging compensation under higher relative motion speed.

In some embodiments, the number of the motion compensation units is two. The two motion compensation units move synchronously and each have a primary rotating structure and a secondary rotating structure. The isotropic displacements and attitude angle angles of the optical components on the two secondary rotating structures are matched within the compensation angle α to ensure that the optical path of the imaging optical path remains unchanged or the change in the optical path is less than a given threshold value.

In some embodiments, the optical assembly of the secondary rotating structure is a concave cylindrical mirror, whose bus is parallel to the rotation shaft of the secondary rotating structure. The pixel sampling rate of the obtained image is increased in the direction of the relative motion, and the resolution of the image is improved at a later stage based on a high sampling rate data recovery method.

In some embodiments, within the compensation angle α, the change of the linear velocity of the optical component of the secondary rotating structure is in a monotonic descending mode, a monotonic ascending mode, or a fluctuating mode. Specifically, the change in the linear velocity of the optical component of the secondary rotating structure may be in a monotonic descending mode, e.g., a high rotation speed goes down to a low rotation speed. The change of the linear velocity of the optical component of the secondary rotating structure may be in a monotonic ascending mode, e.g., a low rotation speed goes up to a high rotation speed. The change in the linear velocity of the optical component of the secondary rotating may be a fluctuating pattern, e.g., a high rotation speed goes down to a lower rotation speed, goes up to a higher rotation speed, and goes down to a lower rotation speed. The change in the linear velocity can be realized based on pre-set parameters or can be adjusted in real time based on external real-time input parameters.

Compared to the prior art, this application has the following beneficial effects.

Based on the unidirectional rotation mode of the primary rotating structure to achieve motion imaging compensation at high speeds, a very high motion speed compensation can be achieved, and the vibration of the unidirectional rotating structure is much smaller than the vibration brought about by the reciprocating motion under the same motion compensation speed. With the increase of the motion compensation speed, the reciprocating motion compensation scheme leads to strong vibration or even unachievable, while the motion compensation scheme provided herein can still work. By changing the rotation speed of the primary rotating structure or/and the distance between the center of the rotation shaft of the primary rotating structure and the center of the rotation shaft of the secondary rotating structure, the linear velocity component required for motion compensation can be obtained. Motion compensation based on the rotation of the reflector using a single primary rotating structure will cause changes in the conformation angle of the field of view of the imaging target. Especially when a large angle is turned over in the imaging time, the single rotating reflector may more seriously cause changes in conformation light angle and thus leads to the image deformation. Therefore, in the present disclosure, a secondary rotating structure is provided on the primary rotating structure and rotates opposite to the primary rotating structure. Through the rotation of the optical components on the secondary rotating structure, the imaging unit or the optical component that guides the conformation light maintains the conformation angle to the field of view of the imaging target unchanged or within a set range of change. The motion imaging compensation method that matches the primary rotating structure with the secondary rotating structure is highly adaptable to a wide range of motion compensation schemes. Based on the establishment of object-square markers, geometric corrections, projection transformations, and accurate measurements of geometric elements can be performed on the acquired images.

Figure 1:
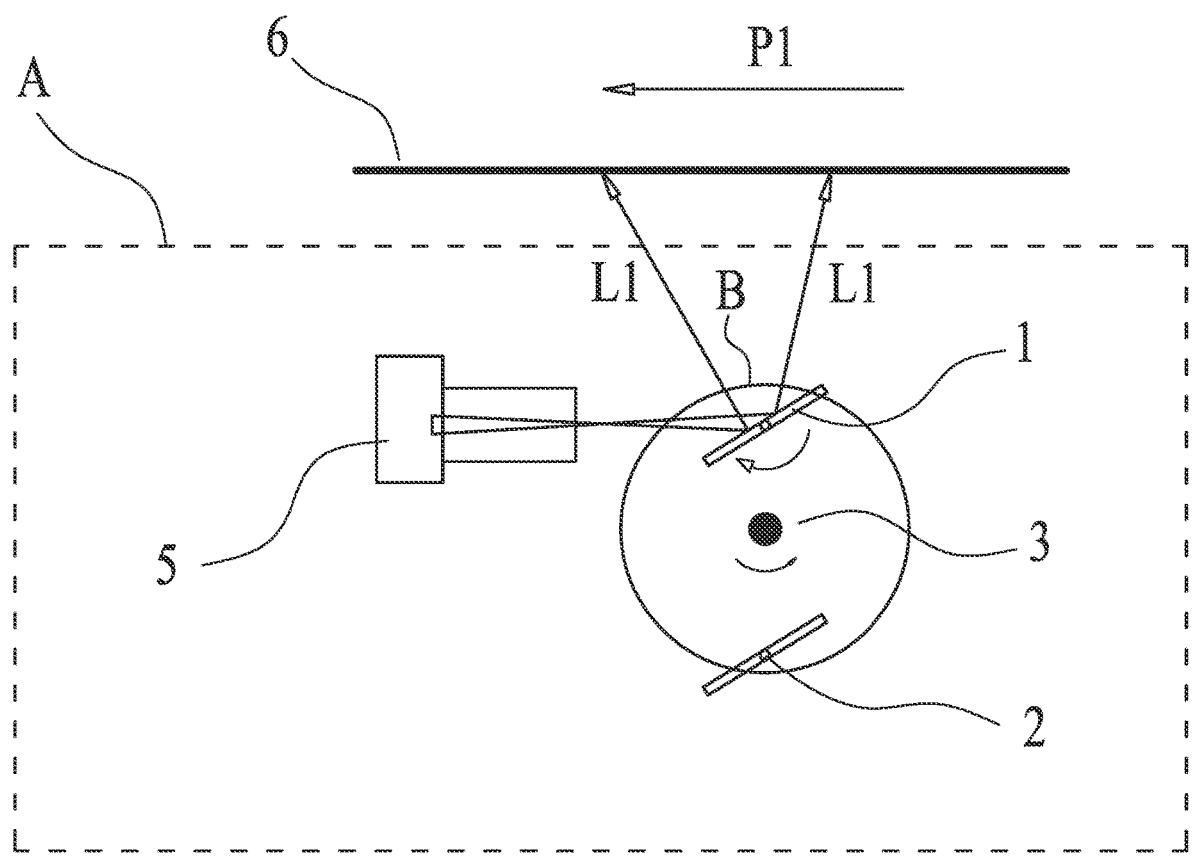
FIG. 1 is a schematic diagram of a motion imaging compensation device according to an embodiment of the present disclosure.

In the drawings: 1, reflector; 2, rotation shaft of a secondary rotating structure; 3, rotation shaft of a primary rotating structure; 4, wheel plate; 5, camera; 6, imaging target; 7, laser ranging unit; 8, camera-mounting plate; 9, rotating sleeve of the camera-mounting plate; 10, camera rotating optical center; 11, first primary rotating structure; 12, second primary rotating structure; 13, third primary rotating structure; 14, primary optical path; and 15, mounting seat.

DETAILED DESCRIPTION OF EMBODIMENTS

All of the features, steps in the method or processes disclosed in this application may be combined in any manner except for mutually exclusive features and/or steps.

It should be noted that relational terms, such as "first" and "second", are merely only to distinguish one entity or operation from another, and do not necessarily require or imply any such actual relationship or order between these entities or operations. Furthermore, the terms "including", "comprising", or any other variant thereof, are intended to cover non-exclusive inclusion, such that a process, method, article, or apparatus including a set of elements includes not only those elements, but also other elements not explicitly listed, or also includes elements that are inherent to such process, method, article or apparatus. Without further limitation, the element defined by the statement "including a . . . " does not exclude the existence of another identical element in the process, method, article or apparatus including said element. The terms "primary rotating structure" and "secondary rotating structure" are descriptions that distinguish two rotating structures in the motion compensation unit, not imply the primary or secondary order. Based on the fact that the primary rotating structure and secondary rotating structure are inseparable, when describing the motion compensation functional components herein, the overall structure including the primary rotating structure and secondary rotating structure is referred to as the primary rotating structure. When an overall structure integrating a plurality of primary rotating structures and secondary rotating structures is used herein, the first primary rotating structure, the second primary rotating structure and the third primary rotating structure are expressed separately for the purpose of distinguishing, which are respectively labeled as 11, 12, 13 in the different accompanying drawings, e.g., 11 in FIGS. 2, 11 and 12 in FIGS. 3, and 11, 12, 13 in FIG. 7.

The dotted boxes in FIGS. 1 and 3-5 denote a motion imaging compensation device A.

Embodiment 1

Figure 2:
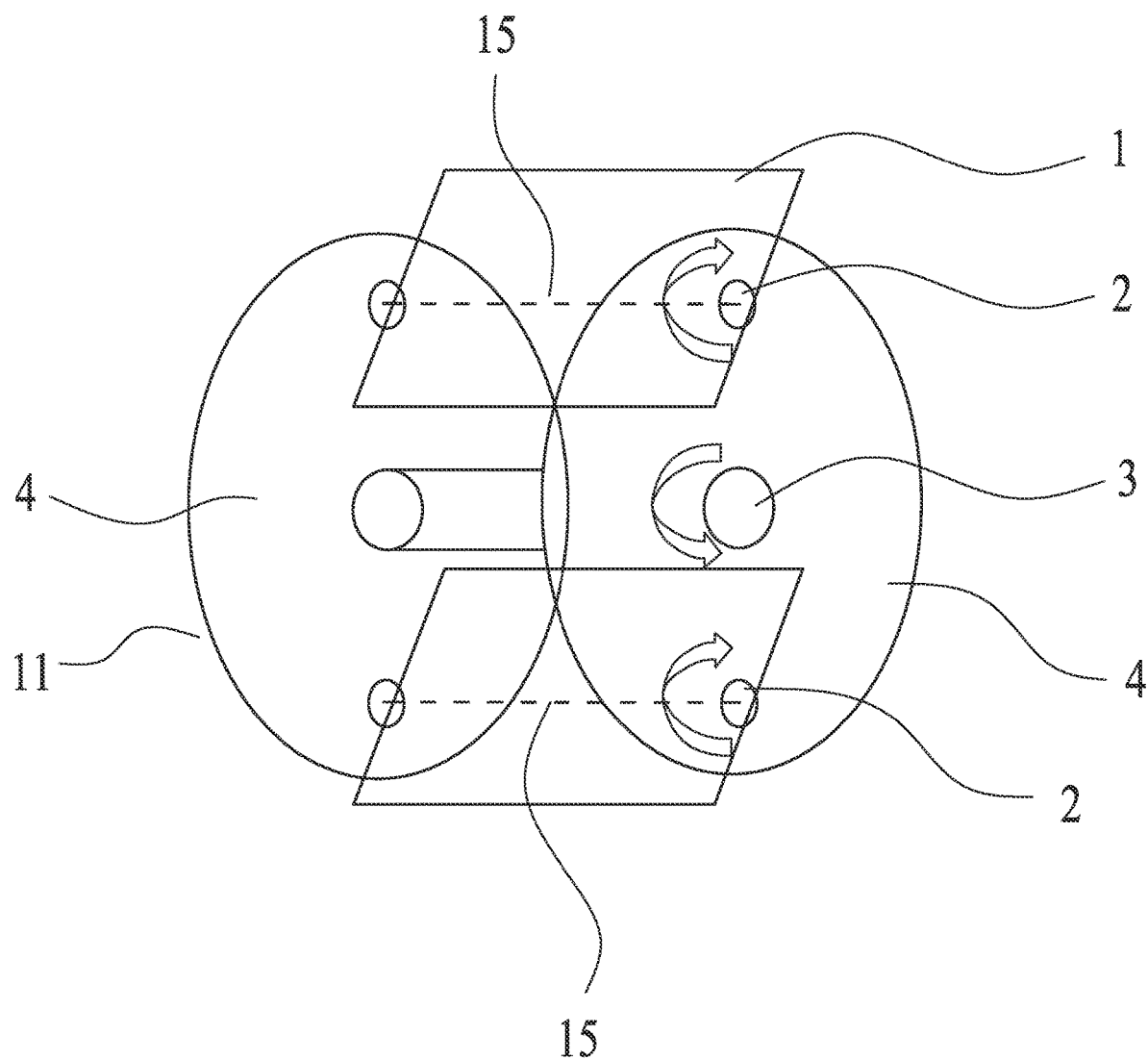
FIG. 2 schematically shows a spatial relationship between a primary rotating structure and a secondary rotating structure of a motion compensation unit according to an embodiment of the present disclosure.

As shown in FIG. 1, a motion imaging compensation device is provided, which includes a base, an imaging unit, a motion compensation unit and a control system. The base has an integral frame-type structure, which connects the imaging unit, the motion compensation unit and the control system as a whole. The motion imaging compensation device is fixedly connected to a carrier, such as a moving train, a car, and an aerospace platform, through the base. The base is provided with the imaging unit, the motion compensation unit, and the control unit. The imaging unit is fixed to the base to ensure that the relative positional relationship between the motion compensation unit and the imaging unit is fixed, so that the optical parameters and distances are definite. As shown in FIG. 2, the compensation motion unit is illustrated. The driving device for rotation of the primary rotating structure is a servomotor, and the servomotor drives the primary rotating structure to rotate around a rotation shaft 3. A rotation shaft 2 of a secondary rotating structure is connected to an optical reflective component. A center of the rotation shaft 2 of the secondary rotating structure is located on a ray with a center of the rotation shaft 3 of the primary rotating structure as the origin. During the motion imaging, the motion imaging compensation device is configured as an observation reference point, with the motion of the motion imaging compensation device fixed on the carrier platform. The primary rotating structure includes a wheel plate 4 and the rotation shaft 3 arranged on the wheel plate 4. The rotation shaft 3 is configured to rotate to drive the wheel plate 4 to rotate. The secondary rotating structure includes a rotation shaft 2 and a mounting seat 15 for mounting the optical component. The rotation shaft 2 is arranged on the wheel plate 4, and the mounting seat 15 is arranged on the rotation shaft 2. The optical component is connected to the mounting seat 15, and rotates with the secondary rotating structure. As shown in FIG. 1, the moving direction of an imaging target 6 is opposite to that of the motion imaging compensation device. The relative motion direction of the imaging target 6 is P1, namely, left, and the relative motion direction of the motion imaging compensation device is right. The primary rotating structure of the motion imaging compensation device rotates counterclockwise, so that the direction of the velocity component of the linear velocity at the position where the secondary rotating structure is located on the primary optical axis of the camera is the same as P1 and the velocity difference is kept within a preset threshold. The conformation light of the camera moves with the imaging target 6 through the reflector 1, and the conformation light L1 enters the camera 5 through the reflector 1 to complete the imaging. The motion imaging compensation device shown in FIG. 1 achieves compensation of relative parallel motion within a set rotation interval angle α. The relative motion speed may be constant or non-constant. The control system controls the operation and image recording of the motion imaging compensation device. The exposure time of the imaging unit is equivalent to the angular interval α of motion compensation that the primary rotating structure rotates through during the exposure time. The primary rotating structure has the same angular velocity as the secondary rotating structure. The primary rotating structure drives the optical reflective component to undergo a circular motion, forming two velocity components, i.e., a vertical component and a horizontal component. The horizontal component realizes a translation along the primary optical axis of the imaging optical path, thus realizing the motion compensation of the imaging target. Within the angular interval α of the motion compensation, it is necessary that the velocity difference between the horizontal component of the linear velocity and the relative motion velocity satisfies a preset threshold range. By adjusting the rotation speed of the primary rotating structure through the servo motor and the servo control system so that the relative motion speed between the imaging unit of the optical reflection component in the direction of the primary optical axis of the imaging unit and the field of view of the imaging target 6 is within the preset threshold value. In this case, it can be approximated that the imaging unit is stationary with respect to the imaging target, and the motion blurring can be effectively avoided. Certainly, in the ideal case, when the relative motion velocity difference is zero, and the motion imaging compensation is most effective.

Regarding the start point and the end point of the compensation angle, according to preference, the position point B at which the linear velocity direction of the optical component is in line with the primary optical axis of the imaging is selected. If point B is the end point, the change in rotation speed is expressed as: raising the rotation speed→lowering the rotation speed to the original rotation speed. If point B is the start point, the change in rotation speed is expressed as: raising the original rotation speed→lowering the rotation speed to the original rotation speed. Otherwise, it will go through the following process: raising the rotation speed from the starting point→lowering the rotation speed to the original rotation speed at point B→raising the rotation speed again→lowering the rotation speed to the original rotation speed again. In terms of effect, in a single imaging process, when point B is selected as the start or end point for changing the rotation speed, the rotation speed only undergoes a "raised→lowered" process once, and the changes in rotation speed when raised and lowered are large. When point B is selected as an arbitrary point in the middle of the compensation interval, the changes in the rotation speed are small during the process of raising the rotation speed from the starting point→lowering the rotation speed to the original rotation speed→raising the rotation speed again→lowering the rotation speed to the original rotation speed again", but the rotation speed is subjected to two consecutive fluctuations. When the vibration caused by the change in rotation speed is not serious, either of the above modes can be used. When the vibration caused by the change in rotation speed is severe, point B is preferably used as the start or end point.

Embodiment 2

The motion imaging compensation device based on Embodiment 1, where the motion compensation unit changes the rotation speed of the primary rotating structure within an angle α required to be imaged by the imaging unit to keep the relative motion speed of the optical reflecting component in the direction of the primary optical axis of the imaging unit to the field of view of the imaging target 6 within a set speed difference for imaging. The adaptation to match with the relative motion speed is achieved by the following steps. When the motion compensation unit rotates to the angle α of imaging compensation in the primary rotating structure, by changing the distance between the center of the rotation shaft 2 of the secondary rotating structure and the center of the rotation shaft 3 of the primary rotating structure, the linear velocity of the secondary rotating structure can be changed, thereby changing the component of the linear velocity of the optical component reflector 1 in the direction of the imaging optical axis. In this case, the relative motion velocity of the optical reflecting component in the direction of the primary optical axis of the imaging unit to the field of view of the imaging target 6 is within the set speed difference followed by imaging. The relative motion velocity may be constant or non-constant. The distance between the center of the rotation shaft of the secondary rotating structure and the center of the rotation shaft of the primary rotating structure can be changed by pushing the secondary rotating structure through an electrodynamic force, a magnetic force, or a mechanical force. For example, a mechanical cam is one of the options of using a mechanical force to change the distance and the attitude. In the process of changing the distance between the secondary rotating structure and the distance of the primary rotating structure without changing the rotation speed of the primary rotating structure to realize the motion speed compensation, the movement trajectory of the secondary rotating structure is a straight line or a curve. It is also possible to use a combination of the method of changing the rotation speed and the method of changing the distance between the secondary rotating structure and the primary rotating structure to change the component of the linear velocity of the optical component reflector 1 in the direction of the imaging optical axis.

Embodiment 3

The motion imaging compensation device based on Embodiments 1 and 2, where a plurality of secondary rotating structures may be provided on the primary rotating structure. The plurality of secondary rotating structures are arranged in a mass-symmetric distribution to avoid jittering due to mass asymmetry during rotating. Two groups, three groups, four groups, or even a plurality of groups of secondary rotating structures are selected on the basis of matching and selecting according to the angle α of imaging compensation of the primary rotating structure, the rotation speed of the primary rotating structure, the time interval between two imaging sessions, and the rotation space of the secondary rotating structure. The more secondary rotating structures and mirrors are provided on the primary rotating structure, the shorter the time interval for each imaging, thus improving the efficiency of imaging. The rotation space of the plurality of secondary rotating structures must not interfere, and the rotation speed of the primary rotating structure depends on the relative motion speed. The angle α of imaging compensation depends on the sensitization time of the imaging unit. The plurality of secondary rotating structures have the same moment of inertia and are symmetrically distributed according to angle bisection. After the geometry of the secondary rotating structure is determined, it is adjusted by a dynamic balance adjustment device. When the primary rotating structure is integrated with the secondary rotating structure, it is adjusted by the dynamic balance adjustment device. When the motion compensation unit is integrated, the intrinsic frequency of the motion imaging compensation device is tested, and is subjected to vibration damping and vibration isolation treatment combined with the vibration characteristics of the carrier platform when in use. Under a given linear velocity component index, the rotation speed of the primary rotating structure can be reduced by increasing the distance between the primary rotating structure and the secondary rotating structure, thus reducing the frequency of vibration.

Embodiment 4

Multi-sensor imaging of the imaging unit can be realized by arranging a image-space telecentric lens in the imaging optical path and arranging a ridge prism behind the image-space telecentric lens for scene segmentation of the imaging target, thereby achieving segmentation imaging of a multi-imaging unit for a scene.

Preferably, a planar reflector may be provided on the secondary rotating structure.

Preferably, a concave cylindrical reflector/convex cylindrical reflector may be provided on the secondary rotating structure, so that the scene is one-dimensionally scaled up or scaled down by the imaging target on the basis of the optical projection of the original lens.

Preferably, a concave column surface reflector is provided on the secondary rotating structure, and the bus of the concave column surface reflector is parallel to the rotation shaft of the secondary rotating structure, which improves the sampling rate of the image in the direction of relative motion.

Figure 6:
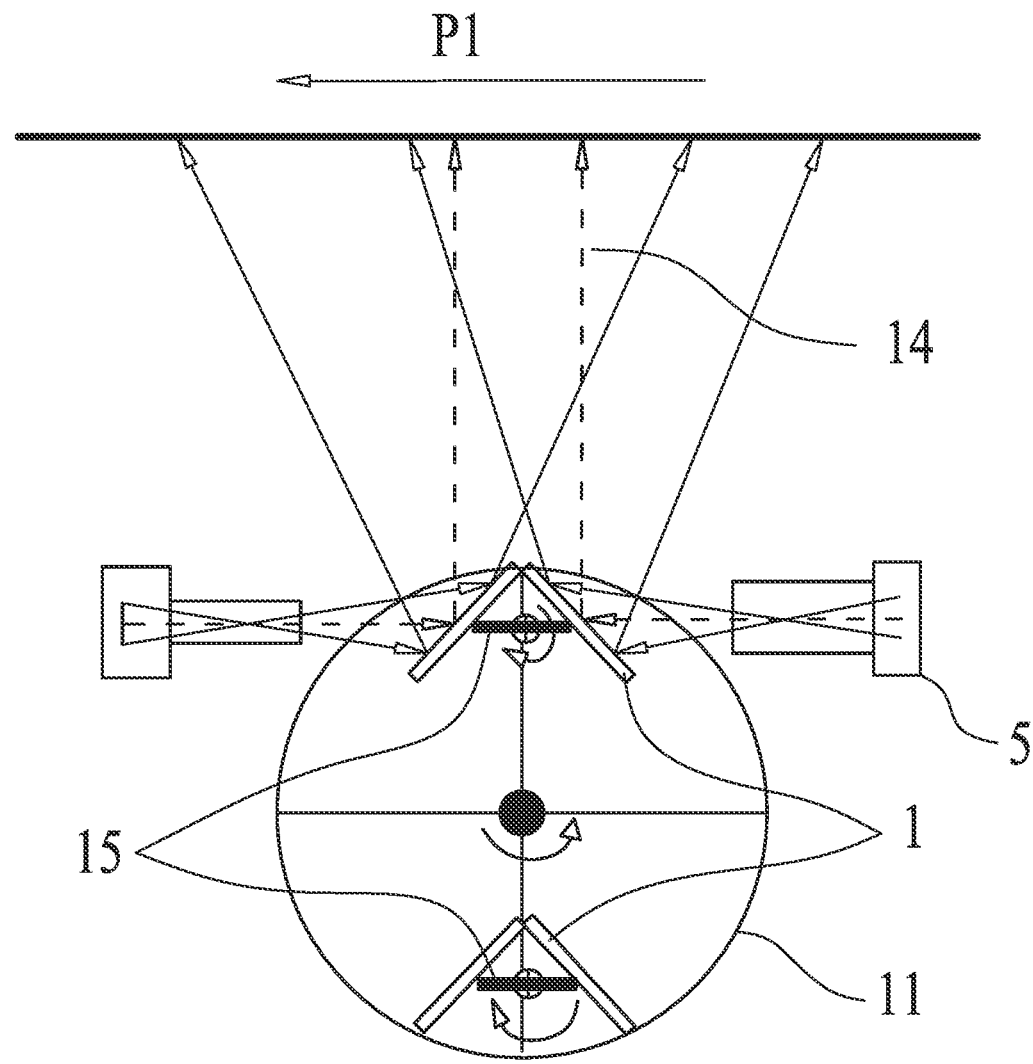
FIG. 6 schematically shows a symmetrical arrangement of double reflectors of a secondary rotating structure on a first primary rotating structure according to an embodiment of the present disclosure.

Preferably, as shown in FIG. 6, the optical component on the secondary rotating structure consists of two reflectors, whose side view is a inverted-V-shaped structure. The rotation shaft of the secondary rotating structure is located at the center of mass of the inverted-V-shaped structure. The two reflectors guide different imaging units to image the same target area or different target areas synchronously. The reflectors are arranged in a mirrored inverted-V-shaped arrangement with respect to the center of rotation or in a non-mirrored arrangement.

Preferably, the two reflectors are symmetrically arranged in a mirrored inverted-V-shaped arrangement to guide two imaging units to perform stereoscopic imaging based on transverse vision.

Preferably, the two reflectors symmetrically arranged in a mirrored inverted-V-shaped arrangement each have different spectral reflective properties, and each guide two imaging units to perform imaging in different spectral wavelength bands.

Preferably, the two reflectors are symmetrically arranged in a mirrored inverted-V-shaped arrangement. One of the two reflectors guides the conformation light of the imaging unit to image the target, and the other of the two reflectors guides a laser to project a pattern or/and a laser beam of a laser ranging device to reach the surface of the target.

Figure 8:
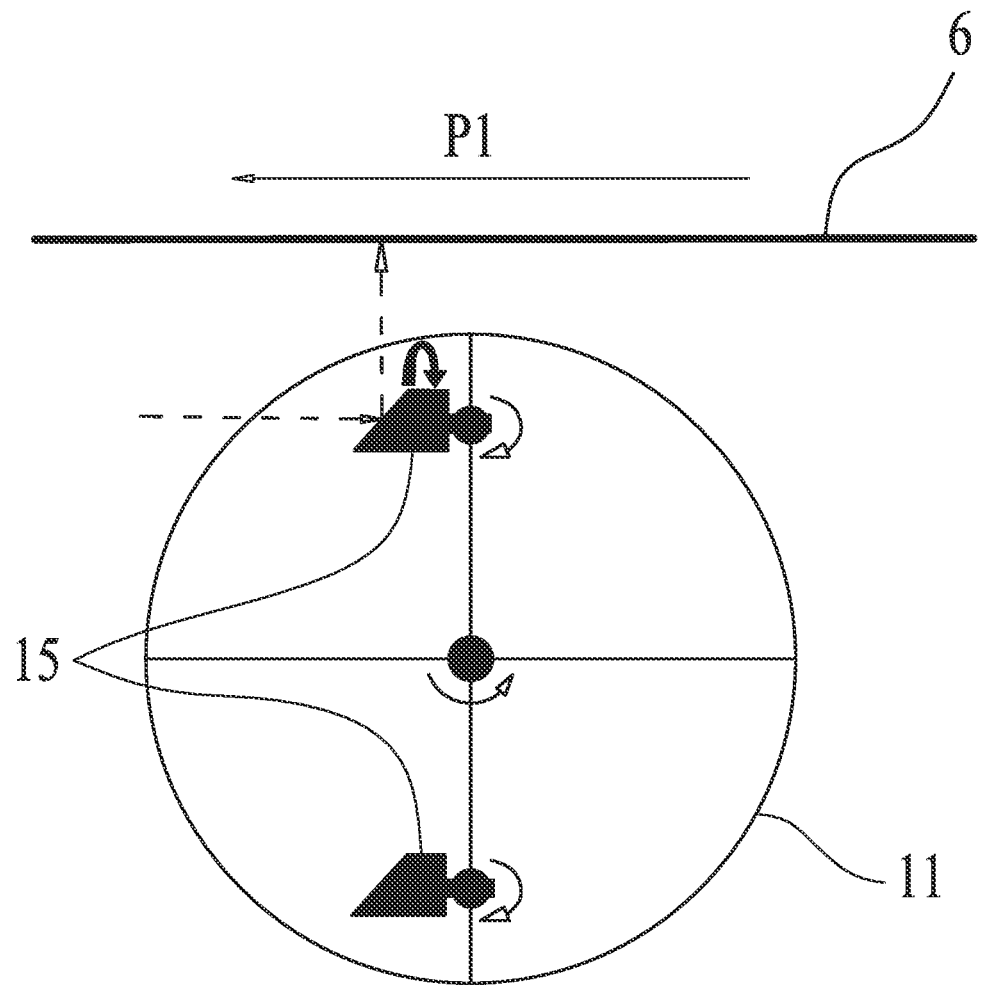
FIG. 8 is a schematic diagram of a rotating optical component on the secondary rotating structure according to an embodiment of the present disclosure.

As shown in FIG. 8: the primary optical path 14 is indicated by a dotted line. A scanning process perpendicular to the direction of motion is realized by the rotation of the reflector 1. The optical component connected to the secondary rotating structure is a set of optical components that are programmedly controlled for rotation. The rotation axes of the set of optical components are perpendicular to the rotation shaft of the secondary rotating structure, and the axis of the rotation axes of the set of optical components are parallel to the direction of motion during the motion compensation imaging process.

Multi-spectral imaging of the imaging unit can be achieved by adding filters, gratings, transmission/reflection mirrors for different wavelengths in the optical path, such that the multi-sensor or single-sensor imaging can be realized using spectral separation.

The addition of optics in the optical path can be a single solution or a combination of multiple solutions.

The optics can be added in front of the lens, in the middle of the lens, and in front of the focal plane in the optical path.

Embodiment 5

The primary rotating structure, the secondary rotating structure and the reflector 1 connected to the secondary rotating structure are all arranged in a vacuum or air-thin sealing environment. Since air resistance may affect the rotation during the rotation of the primary rotating structure, and the optical component driven by the secondary rotating structure, the primary rotating structure, the secondary rotating structure and the reflector 1 connected to the secondary rotating structure are all arranged in a vacuum or air-thin sealing environment, thereby reducing the effect of air resistance on the rotation compensation unit during rotation. However, this solution requires two pieces of window glass to ensure that the conformation light of the imaging target scene is projected onto the optical component of the secondary rotating structure and then enters the imaging unit. Further, the imaging unit and the motion compensation unit can be placed within a vacuum or air-thin sealing environment, removing the window glass on the optical path between the imaging unit and the optical component, which can reduce the loss of light energy and facilitate dust and water resistance of the imaging unit.

Embodiment 6

Figure 3:
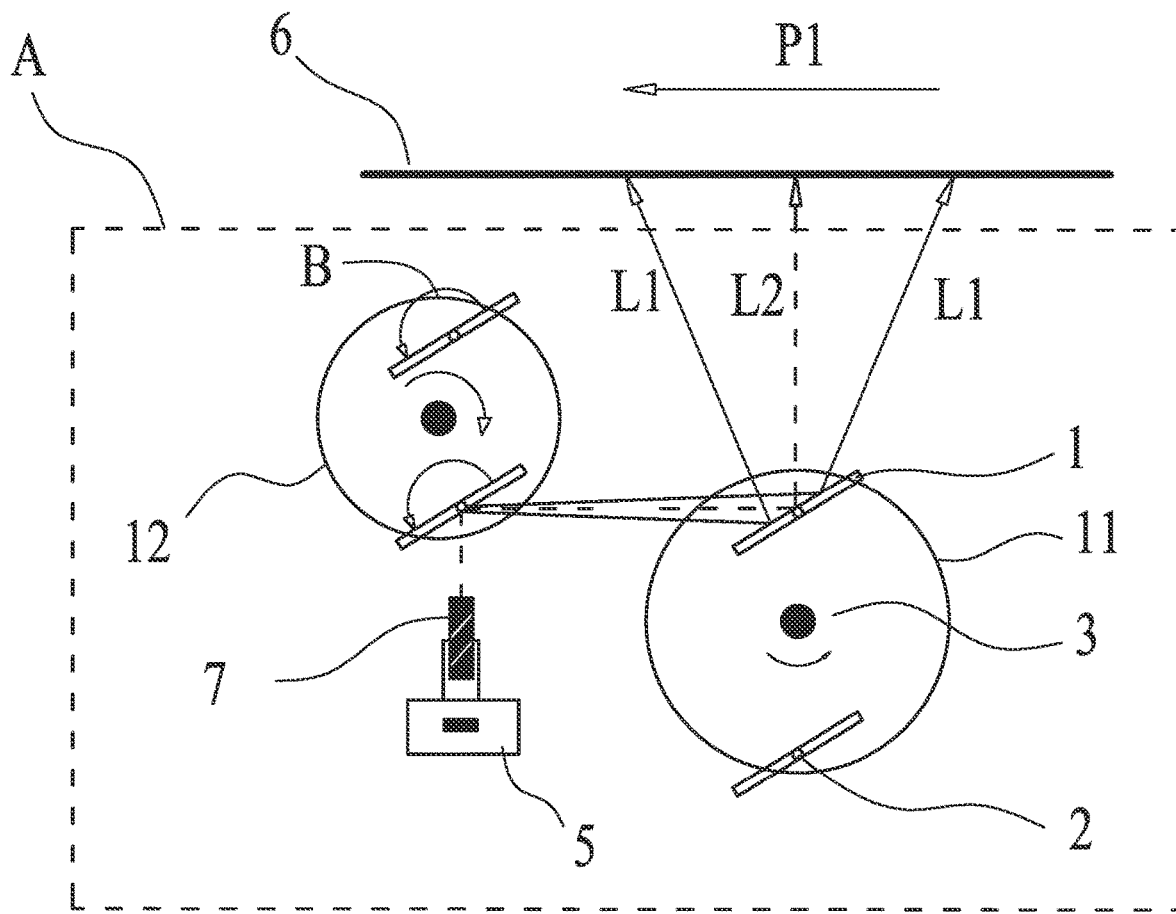
FIG. 3 is a schematic diagram of a motion imaging compensation device including two motion compensation units according to an embodiment of the present disclosure.

The motion imaging compensation device based on Embodiment 1 includes two motion compensation units. As shown in FIG. 3, the motion imaging compensation device includes two motion compensation units, and each motion compensation unit includes a primary rotating structure. A first primary rotating structure 11 is illustrated at the lower right of FIG. 3, and a second primary rotating structure 12 is illustrated at the upper left of FIG. 3. The two secondary rotating structure respectively on the two primary rotating structures have the same direction of the linear velocity and the same speed. Two reflectors guide the conformation light of the imaging target into the imaging unit. The motion imaging compensation device further includes a laser ranging unit 7. The laser ranging unit 7 is provided on a base. During the motion imaging, as the carrier platform runs, the imaging target 6 is in relative motion with the motion imaging compensation device, and the relative motion direction of the imaging target 6 is P1. The first primary rotating structure 11 rotates to enable the direction of the linear velocity component of the secondary rotating structure matched thereto to be the same as P1. The second primary rotating structure 12 rotates to enable the direction of the linear velocity component of the secondary rotating structure matched thereto to be the same as P1. The optical components on the first primary rotating structure 11 and the second primary rotating structure 12 move at the same speed, and the spatial attitude angles of the optical components on the first primary rotating structure 11 and the second primary rotating structure 12 are unchanged. The conformation light L1 is reflected onto the reflector on the second primary rotating structure 12 through the reflector 1 on the first primary rotating structure 11, and then enters into the camera 5 such that the imaging is completed. The laser ranging unit 7 emits a laser beam. The emission direction of the laser beam light L2 emitted by the laser ranging unit can be the same as the orientation of the lens of the camera 5 of the corresponding imaging unit, so as to obtain the distance data between the imaging area corresponding to the image captured by the imaging unit and the imaging unit. The synchronized movement of the two optical components compensates for the distance variation of the laser beam when there is only one movement compensation mechanism. The laser ranging data is converted to the distance of the equivalent optical center of the camera, i.e., the object distance, and the scale of the image is calculated. In the imaging process, the object-square mark is projected to the imaging target 6 scene through the imaging optical path. The object-square mark includes a light spot or a light pattern. The light spot is a simple laser light spot or a light spot projected by the laser ranging device, and the light pattern is a structured light pattern or a combination of light spots or patterns. The electromagnetic wave wavelengths of the light pattern include ultraviolet wavelengths, visible wavelengths, and infrared wavelengths which can be detected and recorded. The motion compensation and length correction of the ranging light beam of the light spot of the object-square mark are performed through the following steps. The optical range length of the laser ranging laser beam can be guided by a set of reflective components moving parallel to each other and at the same speed to ensure that the optical range length does not change with the movement of the single reflective component. For the structure configured with a single motion compensation unit, after the optical range lengths of the laser beam and the conformation beam are changed due to the movement of the single reflective component, the optical range length of the laser beam is corrected by determining the displacement distance of the reflective component, and the time of the laser ranging device for implementing the ranging is synchronized with the time for the imaging. The imaging unit has a fixed positional relationship with the laser projector, and the fixed positional relationship solidifies the geometrical relationship of the laser pattern on the image, providing control points and control lines for geometrical correction and projection transformation of the image.

Figure 7:
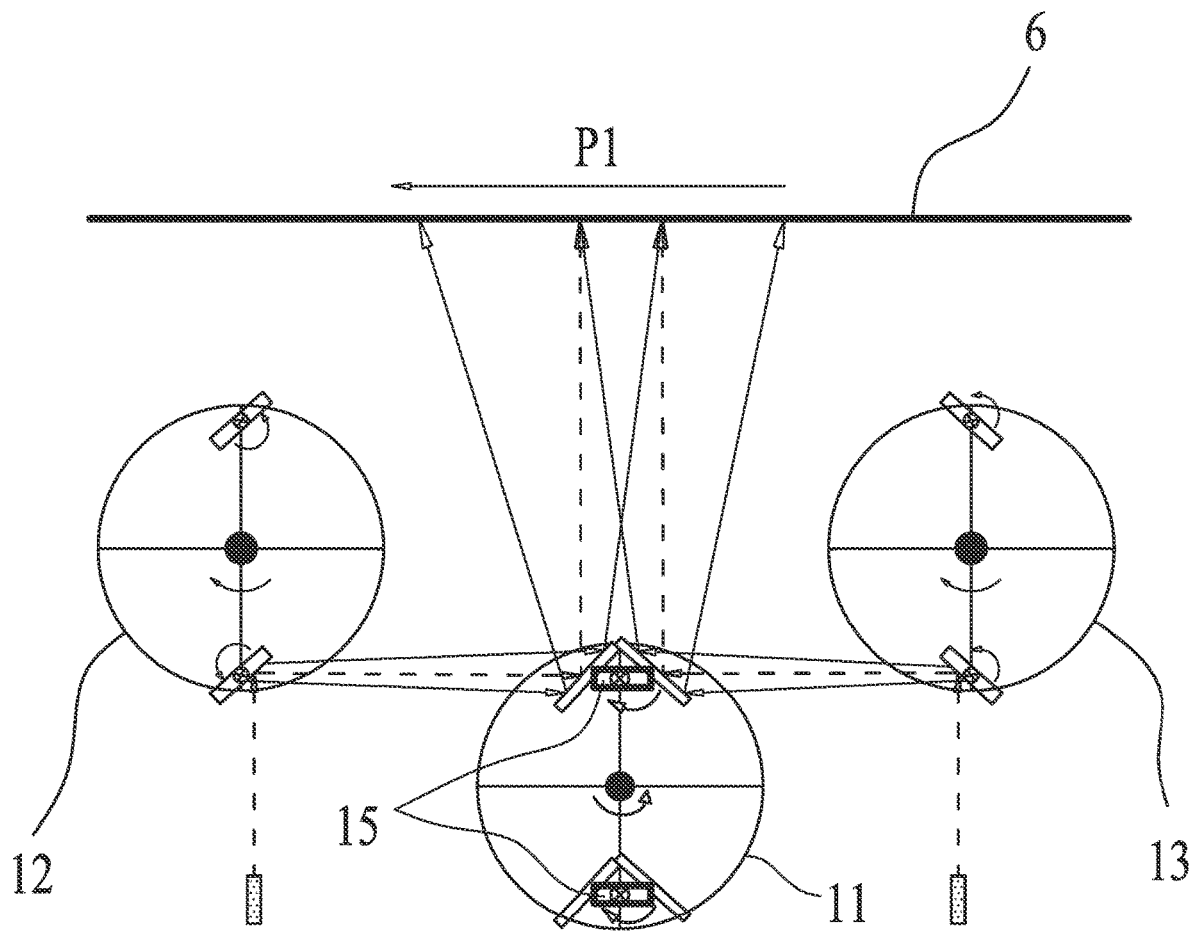
FIG. 7 schematically shows the motion imaging compensation device with double compensation according to an embodiment of the present disclosure.

In another embodiment, the motion imaging compensation device based on Embodiments 1 and 4 includes three motion compensation units. As shown in FIG. 7: the first primary rotating structure 11 completes the 1$^{st}$ motion compensation, and the second primary rotating structure 12 realizes the 2$^{nd}$ motion compensation. The combination of the first primary rotating structure 11 and the second primary rotating structure 12 realizes two motion compensations for the imaging process of the left imaging unit. Similarly, the first primary rotating structure 11 completes the first motion compensation, and the third primary rotating structure 13 realizes the second motion compensation. The combination of the first primary rotating structure 11 and the third primary rotating structure 13 achieves two motion compensations for the imaging process of the right imaging unit.

Further, the laser pattern projection device is used on the right side to project the laser pattern onto the imaging target area by reflecting the laser pattern twice through the optical components of the secondary rotating structure on the third primary rotating structure 13 and the optical components of the secondary rotating structure on the first primary rotating structure 11.

Embodiment 7

Figure 4:
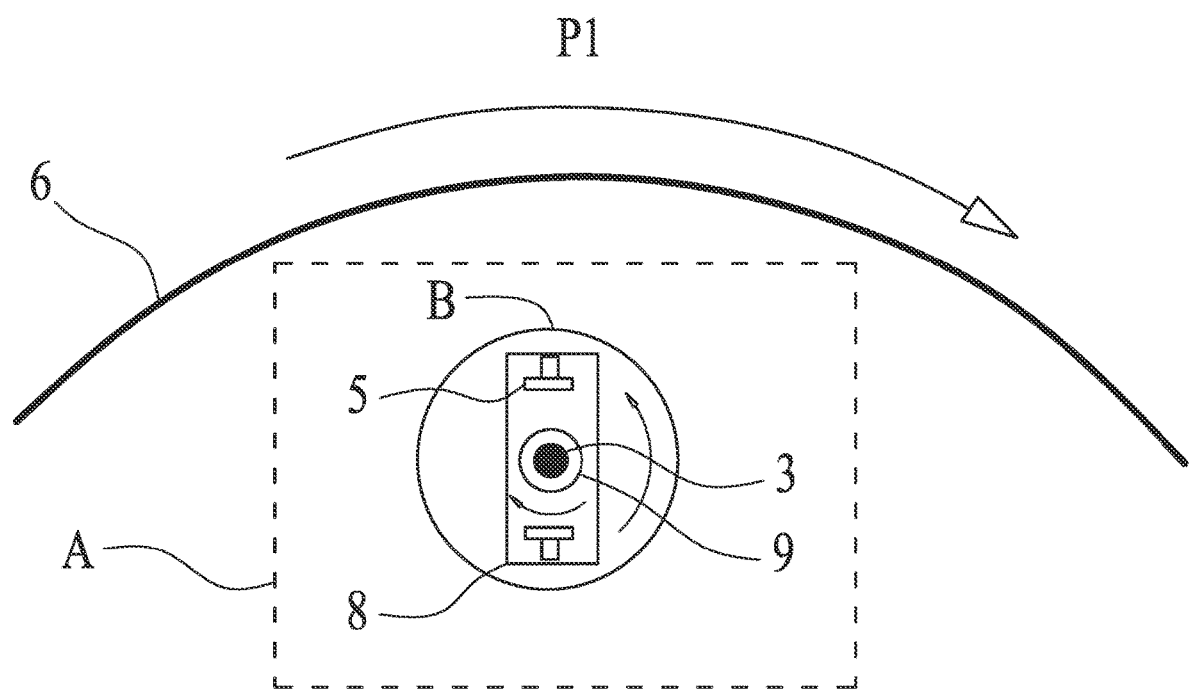
FIG. 4 schematically shows rotating motion of the motion imaging compensation device according to an embodiment of the present disclosure.

A motion imaging compensation device based on Embodiment 1 is shown in FIG. 4, including a primary rotating structure. The primary rotating structure is provided with a camera-mounting plate 8 with the same axis as the primary rotating structure. A rotating sleeve 9 of the camera-mounting plate 8 is concentrically provided on the axis of the primary rotating structure. Two cameras 5 are symmetrically provided on two ends of the camera-mounting plate 8, and the rotating sleeve 9 is provided in the middle of the camera-mounting plate 8. Under a motion mode of relative rotation in a desired panoramic surrounding environment, the rotational motion imaging will produce rotational blurring. The use of the rotational motion imaging compensation device makes it possible to compensate for the rotational angular displacement of the imaging unit when the imaging unit performs circumferential motion imaging of the external surroundings. The motion direction of the imaging target 6 relative to the rotational motion compensation device is P1. The relative rotation direction of the primary rotating structure is counterclockwise. The rotation direction of the angular displacement compensation when the camera undergoes circular motion imaging is clockwise, and the rotation direction of the camera for reset after completing the imaging compensation is counterclockwise. Similarly, when the primary rotating structure rotates in a clockwise direction, the rotation direction of the angular displacement compensation when the camera undergoes circular motion imaging is counterclockwise, and the rotation direction for the angle compensation reset is clockwise. The direction of rotation corresponding to the motion imaging compensation of the imaging unit depends on the direction of displacement generated by the relative motion between the imaging unit and the imaging target, and the imaging is completed during the time that the conformation light of the imaging unit gazes at the target.

When the motion imaging compensation device moves with the carrier in an arc motion for imaging, the motion imaging compensation device is provided with a reflector, so that when the imaging unit performs circular motion imaging for the surrounding environment, the imaging unit is subjected to translation compensation and angle compensation.

Embodiment 8

Figure 5:
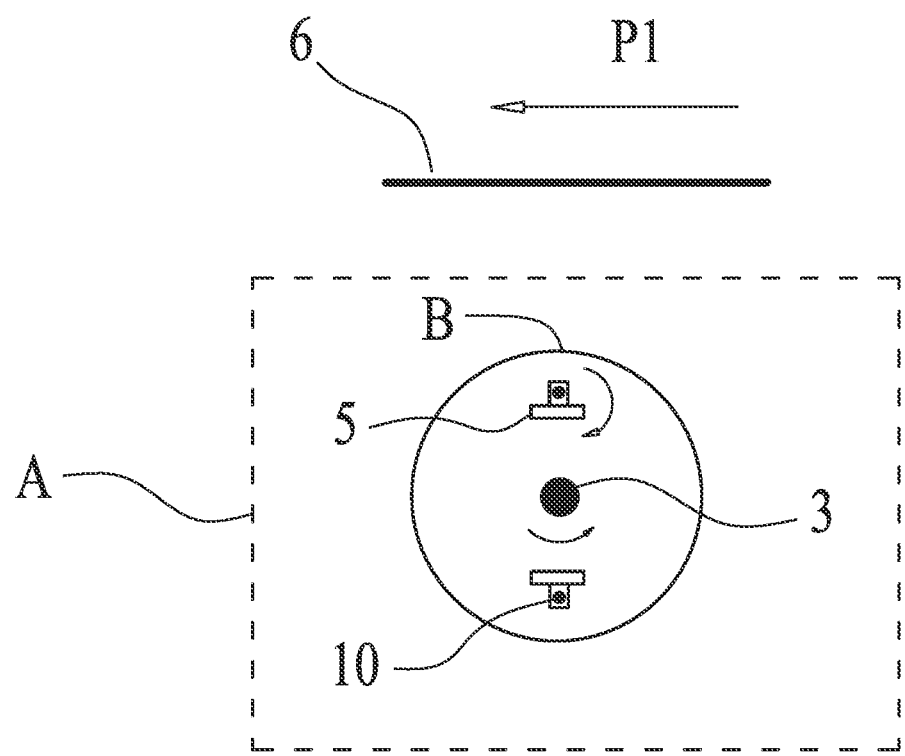
FIG. 5 schematically shows parallel motion of the motion imaging compensation device according to an embodiment of the present disclosure.

A parallel motion imaging compensation device based on Embodiment 1 is shown in FIG. 5, which includes a primary rotating structure. The primary rotating structure is provided with two camera 5, and rotating optical centers 10 of the two camera 5 are symmetrically distributed along the rotation shaft 3 of the primary rotating structure. The motion direction of the imaging target 6 with respect to the rotating motion compensation device is P1. When the primary rotating structure rotates counterclockwise, the angular compensation rotation direction of the rotating optical center 10 is clockwise. When the primary rotating structure rotates clockwise, angular compensation rotation direction of the rotating optical center 10 is counterclockwise, so as to realize the motion imaging compensation under the parallel motion state.

Embodiment 9

This application also provides a motion imaging compensation method based on the motion imaging compensation device in Embodiments 1-8. The method includes the following steps.

The primary rotating structure rotates in one direction. The components of the linear velocity of the secondary rotating structure on the primary rotating structure and the optical component connected to the secondary rotating structure in the direction of the relative motion of the imaging target cancel out the component of the relative motion of the imaging target, so that the difference between the component of the linear velocity of the secondary rotating structure parallel to the primary optical axis of the imaging unit and the relative motion velocity of the imaging field of view is kept within a preset threshold value.

The secondary rotating structure rotates. The structure formed by the secondary rotating structure and the optical component maintains that the angle of the optical axis of the primary optical axis of the imaging unit pointing towards the field of view is unchanged or is changed within a preset threshold value during the imaging process.

The photographic imaging process of the imaging unit is in the same time period as the motion compensation, so that the field of view of the imaging target guided into the imaging optical path is imaged in a time period that satisfies the preset threshold value of the relative displacement difference, thereby reducing the motion blur of the obtained image.

The device for projecting the laser pattern is connected to the secondary rotating structure, and rotates with the rotation of the secondary rotating structure. When the reflectors on the secondary rotating structure keep the imaging target area relatively stationary with respect to the imaging target surface, the effect of the pattern projected by the laser pattern projecting device having a rigid connection with the secondary rotating structure on the imaging target area is also relatively stationary or the relative motion velocity difference thereof is less than the given threshold value. In such cases, the laser pattern does not produce slur on the imaged image.

Preferably, the laser projection device pre-adjusts and fixes its spatial attitude angle and spatial position, and pre-calculates the spatial geometric relationship of the pattern to form parameters useful for image geometric correction. The laser projection device pre-adjusts and fixes its spatial attitude angle and spatial position, and the spatial triangular geometrical relationship between the laser pattern and the imaging unit forms a definite functional relationship, through which parameters useful for image geometrical correction and scale correction can be obtained.

The optical component of the secondary rotating structure is a concave cylindrical reflector. The bus of the concave cylindrical reflector is parallel to the rotation shaft of the secondary rotating structure. The pixel sampling rate of the obtained image is increased in the direction of the relative motion, and the resolution of the image is improved in the later stage through the high sampling rate data recovery method.

The driving force for the rotation of the secondary rotating structure in the motion compensation angle interval $\alpha$ (the compensation angle $\alpha$ refers to an angle that the primary rotating structure of the motion compensation unit rotates within the time for one photographic imaging) may be an independent power unit, or the power of the primary rotating structure may be mechanically conducted to the secondary rotating structure.

The specific realization process of the method is described as follows. The primary rotating structure rotates unidirectionally. The optical reflector is rigidly connected to the secondary rotating structure, where the rotation axis of the optical reflector with an angular velocity w is parallel to the rotation shaft of the primary rotating structure. The relative motion speed parameter between the imaging target and the motion imaging compensating device is captured, which is the component $V_1$ of the linear velocity that the secondary rotating structure should reach in the direction of the relative motion of the imaging target within the compensation angle $\alpha$. After calculating $V_1$, the control parameters corresponding to the rotation speed of the primary rotating structure are obtained and fed back to the control system to control the change of the rotation speed of the primary rotating structure. The secondary rotating structure rotates opposite to the primary rotating structure, and drives the optical component to rotate. The spatial angle of the optical component remains unchanged all the time for the attitude angle compensation. The angle of the optical axis pointing to the field of view remains unchanged or is changed within a preset threshold. The linear velocity $V_2$ of the imaging field of view is collected and fed back to the control system. The linear velocity $V_1$ of the secondary rotating structure is compared to the linear velocity $V_2$ of the imaging field of view within the compensation angle interval $\alpha$, and the control system calculates the difference between the linear velocity $V_1$ of the secondary rotating structure 2 and the linear velocity $V_2$ of the imaging field of view. When the difference is greater than the preset threshold range, the linear velocity $V_1$ of the secondary rotating structure 2 is compensated, so that the difference between the linear velocity $V_1$ of the secondary rotating structure 2 and the linear velocity $V_2$ of the imaging field of view remains in the preset threshold range.

The imaging unit and the motion compensation unit are connected to the base. The primary rotating structure of the motion compensation unit achieves velocity compensation through the linear velocity component of unidirectional rotation. The secondary rotating structure rotates opposite to the primary rotating structure. The secondary rotating structure rotates to keep the spatial attitude angle of the optical components unchanged, so as to satisfy the unchanged optical path of imaging during motion imaging compensation. Based on the relationship between the imaging unit and the optical component imaging optical path of the motion compensation unit, the relative motion speed and the sensitization time, the length of the linear velocity component required for motion compensation, the start point of the corresponding imaging sensitization time and the duration thereof are determined, and the rotational angular compensation interval angle corresponding to the primary rotating structure is determined. The rotational angular speeds and rotation directions of the primary rotating structure and the secondary rotating structure are controlled, and/or the distance between the center of the rotation shaft of the secondary rotating structure and the center of the rotation shaft of the main rotating structure is changed. In the process of light-sensitive imaging of the imaging unit, the rotation of the primary rotating structure enables the component of the linear velocity of the optical components on the secondary rotating structure in the direction of the primary optical axis of the imaging unit and the relative motion speed of the imaging target within the preset threshold. The rotation of the secondary rotating structure keeps the spatial attitude angle of the optical components unchanged during the imaging process, so as to gaze the field of view of the imaging target, thereby achieving the imaging with the relative motion speed of the field of view of the imaging target to the imaging system within a set speed difference threshold.

Described above are merely preferred embodiments of the present application, which are not intended to limit the present application. Any changes or replacements made by those skilled in the art without making creative effort shall be included within the scope of the present disclosure defined by the appended claims.

What is claimed is:

1. A motion imaging compensation device, comprising:
   a base;
   an imaging unit;
   a motion compensation unit; and
   a control system;
   wherein the base is configured to fix a spatial position of the imaging unit and a spatial position of the motion compensation unit; the control system is configured to control operation of the motion imaging compensation device; the motion compensation unit comprises a primary rotating structure, a secondary rotating structure and an optical assembly; the optical assembly is arranged at an optical path between a light-sensitive target surface of the imaging unit and an imaging target; the optical assembly is configured to rotate with a rotation shaft of the secondary rotating structure; a center of the rotation shaft of the secondary rotating structure is located on a ray with a center of a rotation shaft of the primary rotating structure as an origin; and a rotation direction of the primary rotating structure is opposite to that of the secondary rotating structure, and a rotating angular velocity of the primary rotating structure is the same as that of the secondary rotating structure.

2. The motion imaging compensation device of claim 1, wherein the number of the secondary rotating structure is two or more, and two or more secondary rotating structures are provided on the primary rotating structure.

3. The motion imaging compensation device of claim 1, wherein the optical assembly comprises a first optical component connected to the secondary rotating structure, and a second optical component arranged in front of a lens, in a middle of a lens group or between a focal plane and the lens; and the first optical component and the second optical component are independently selected from the group consisting of a reflective device, a trapped wave reflection device, a semi-transparent device, a concave cylindrical reflective device, a convex cylindrical reflective device, a spherical surface reflective device, a bandpass device, a telecentric optical path device, and a combination thereof.

4. The motion imaging compensation device of claim 3, wherein the first optical component is a reflective mirror assembly having two or more reflection directions; the reflective mirror assembly has an inverted V-shaped vertical section; and reflective mirrors of the reflective mirror assembly have different or the same spectral or/and optical characteristics.

5. The motion imaging compensation device of claim 3, wherein a rotation shaft of the first optical component is perpendicular to the rotation shaft of the secondary rotating structure; and an axial direction of the rotation shaft of the first optical component is parallel to a direction of a relative motion during motion imaging compensation.

6. The motion imaging compensation device of claim 1, wherein the motion compensation unit is located in a vacuum or air-thin sealing environment, or the motion compensation unit and the imaging unit are both located in a vacuum or air-thin sealing environment.

7. The motion imaging compensation device of claim 1, wherein a concentric rotating structure is provided on the primary rotating structure; the imaging unit is provided on the concentric rotating structure; the concentric rotating structure is configured to rotate at the same angular velocity with the primary rotating structure but in a direction opposite to the rotation direction of the primary rotating structure at an imaging moment or within a motion compensation angle interval α of the primary rotating structure; and the imaging unit is configured to rotate with the concentric rotating structure to allow a primary optical axis of a camera to move with an imaging field of view.

8. The motion imaging compensation device of claim 1, further comprising:
   one or more laser devices;
   wherein the one or more laser devices are provided on an imaging optical path constituted by the imaging unit, and are configured to project a laser pattern onto the imaging target; the one or more laser devices are each independently a laser spot projector, a structured light projector, or a laser rangefinder; and the laser pattern projected onto the imaging target is a light spot, a light pattern, or a combination of the light spot and the light pattern based on laser wavelength and shape.

9. The motion imaging compensation device of claim 8, wherein the one or more laser devices are connected to the secondary rotating structure, and are configured to rotate with the secondary rotating structure.

10. The motion imaging compensation device of claim 1, wherein the number of the motion compensation unit is two; for each of two motion compensation units, the primary rotating structure and the secondary rotating structure are the same in number; two primary rotating structures have the same rotation parameters and opposite rotation directions; two secondary rotating structures on the imaging optical path have the same rotation parameters and opposite rotation directions; and displacements along the same direction and attitude angles of optical assemblies provided on the two motion compensation units are matched to ensure that an optical path of the imaging optical path remains constant or a change in the optical path is less than a threshold.

11. A motion imaging compensation method based on the motion imaging compensation device of claim 1, comprising:
   assuming that a relative motion between the motion imaging compensation device and the imaging target is a parallel motion or a rotation motion;
   unidirectionally rotating the primary rotating structure of the motion compensation unit, such that a direction of a linear velocity component of the secondary rotating structure and an optical component of the optical assembly connected to the secondary rotating structure is the same as a motion direction of the imaging target; wherein time for one photographic imaging corresponds to a compensation angle α that the primary rotating structure of the motion compensation unit rotates; and within the compensation angle «, a relative motion velocity difference is kept within a first threshold range; and
   driving, by the secondary rotating structure, the optical component to rotate; wherein an angle change of a conformation light of the imaging unit is maintained within a second threshold range, so that photosensitive imaging is performed with the imaging unit and a field of view of the imaging target kept in a relative static state.

12. The motion imaging compensation method of claim 11, wherein within the compensation angle α, the primary rotating structure changes a rotation speed such that a component difference of a linear velocity generated by a center of the rotation shaft of the secondary rotating structure in a direction of the relative motion of the imaging target is kept within the first threshold range, and the secondary rotating structure drives the optical component to rotate to keep the angle change of the conformation light of the imaging unit within the second threshold range.

13. The motion imaging compensation method of claim 11, wherein when an independent power unit is adopted to drive the secondary rotating structure to rotate, a distance between the center of the rotation shaft of the secondary rotating structure and the center of the rotation shaft of the primary rotating structure is changed to keep a component difference of a linear velocity generated by the rotation shaft of the secondary rotating structure in a direction of the relative motion of the imaging target within the first threshold range.

14. The motion imaging compensation method of claim 11, wherein a change of a linear velocity of the optical component is in a monotonic descending mode, a monotonic ascending mode or a fluctuating mode within the compensation angle α.

* * * * *